March 20, 1928.  1,663,455

J. B. LUKOMSKI

MOLDING APPARATUS

Filed July 9, 1925   2 Sheets-Sheet 1

Inventor
John B. Lukomski,
By
Attorneys

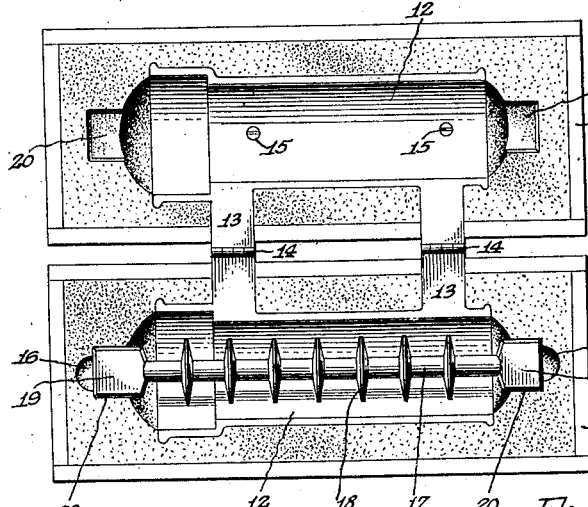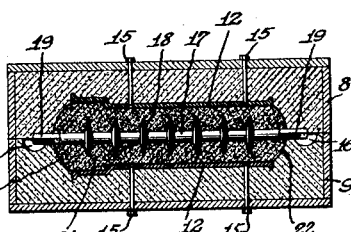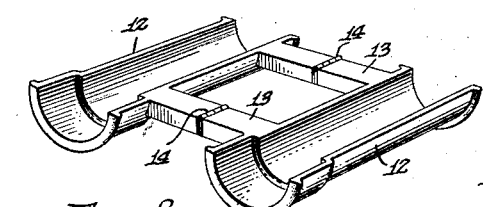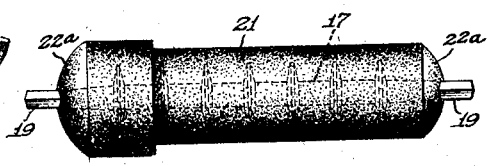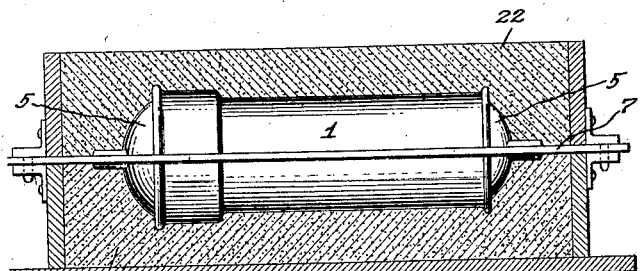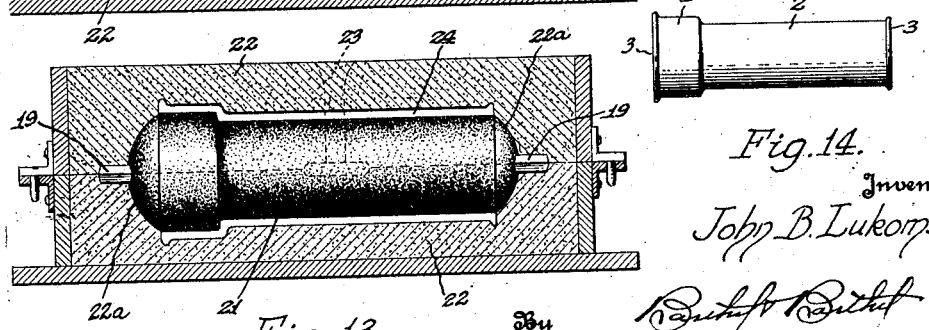

Patented Mar. 20, 1928.

1,663,455

UNITED STATES PATENT OFFICE.

JOHN B. LUKOMSKI, OF DETROIT, MICHIGAN.

MOLDING APPARATUS.

Application filed July 9, 1925. Serial No. 42,449.

This invention relates to a molding apparatus involving a method of casting or molding short sections of sewer pipe, elbows, T's and other fittings or conduits from plastic or molten material, for instance, iron.

My invention involves the preparation of various kinds of molds which contribute to the molding of a cast iron pipe, devoid of fittings, flashes and other protuberances or imperfections. In the molding of cast iron pipes and the preparation of the various molds and a core incident to a cylindrical iron conformation, imperfections in the molds or inequalities between a mold and its core, because of shrinkage, causes the formation of fittings, ribs or other demarcations, which when pronounced produce an inferior article. To eliminate the formation of such imperfections is the main purpose of this invention and it is accomplished by a molding apparatus that not only eliminates the imperfections, but materially reduces the number of operations, labor and time, in a foundry where cast iron pipes are produced.

The advantages gained by my invention will be more apparent when the nature of the molds and method of production is better understood, so reference will now be had to the drawings, wherein Figure 1 is a longitudinal vertical sectional view of a mold showing a core therein for preparing the mold for a core;

Fig. 8 is a perspective view of the core pattern;

Fig. 9 is a plan of the mold in an open position with the core pattern therein and a core holder in position;

Fig. 10 is a vertical longitudinal sectional view of the mold in a closed position showing the formation of a core about the core holder;

Fig. 11 is a side elevation of the complete core;

Fig. 12 is a view similar to Fig. 1 showing a mold prepared to receive the core;

Fig. 13 is a similar view with the core mounted therein preparatory to pouring molten metal or plastic material in the mold, and Fig. 14 is a side elevation of a cast iron pipe produced by the mold.

Figure 1:
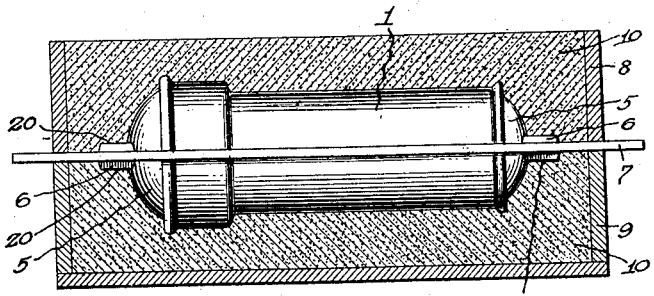
Figure 2:
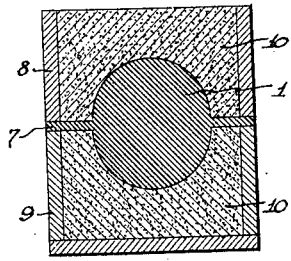
Fig. 2 is a cross sectional view of the same.
Figure 3:
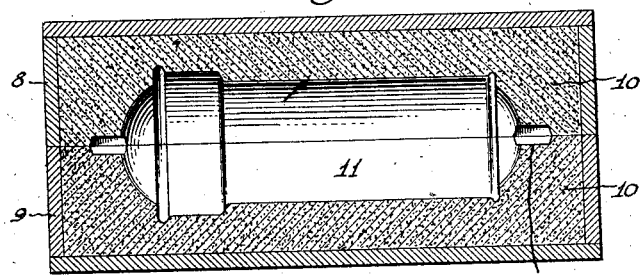
Fig. 3 is a longitudinal vertical sectional view of the core removed and prepared to receive a core pattern.
Figure 4:
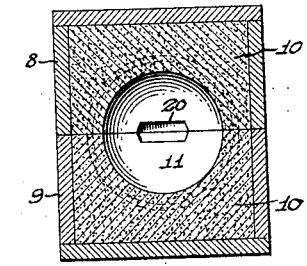
Fig. 4 is a cross sectional view of the same.
Figure 5:
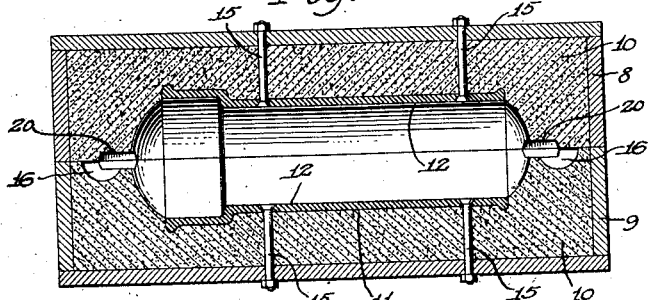
Fig. 5 is a vertical longitudinal sectional view of the mold with the core pattern secured therein.
Figure 6:
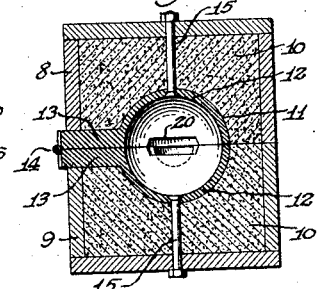
Fig. 6 is a cross sectional view of the same.
Figure 7:
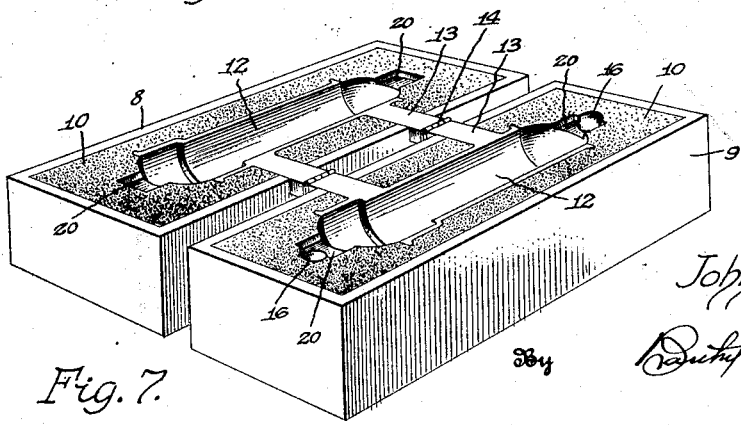
Fig. 7 is a perspective view of a mold in an open position.

To produce a cast iron pipe, as an example of an article that may be made, I first provide a cope and drag core or nowel 1 having an outer wall configuration approximating a short section of cast iron pipe 2 which has end flanges 3 and an enlarged or socket end 4 adapted to receive the small end of a pipe to be coupled thereto. The core 1 is prepared of a suitable material, as metal, and is formed with rounded ends 5, recessed cores 6, and a lateral supporting member 7 by which the core may be supported between a cope 8 and the drag 9. The metal core is used separably in connection with the cope and drag and with suitable quantities of plaster of Paris 10 or other plastic material in the formation of the cope or drag, as shown in Figs. 3 and 4.

In producing the core 1 its rounded ends 5 are made true to size so that when there is shrinkage in the plaster of Paris or plastic material 10 the core cavity 11 will be slightly oversize and thus leave a slight end space relative to the core 1.

A core pattern is now used composed of parts 12 having long hinge members 13 hingedly connected together, as at 14, and the cope and drag have side walls thereof and the plaster of Paris body 10 cut away to accommodate the long hinge members 13, so that the parts of the core pattern may be placed in the cavity 11 formed in the plaster of Paris body 10 of the cope and drag. To hold the core pattern in position the body 10 of the cope and drag is drilled to accommodate stay bolts 15 or other pattern retaining means, and it is at this stage of procedure that the drag 8 has its plaster of Paris body 10 further recessed, as at 16 to afford finger clearance, for the purpose as will hereinafter appear.

A core holder 17 is now employed in connection with the drag 8, said core holder comprising a rod having suitable webs 18 and comparatively flat heads 19 which are placed in the recess 20 formed by the recessed core 6 in the drag 9. The placing of this core holder in position is facilitated by the finger clearing recess 16 of said drag. With the core holder in position the cope and drag are now ready to be packed with sand or other core material so that eventually there is produced a sand core 21 having rounded ends 22ª with the head 19 of the core holder protruding therefrom to facilitate safely handling the sand core.

Another flask or mold is now used and prepared similar to the cope 8 and the drag 9, with the exception that instead of using plaster of Paris as a mold body, I use sand 22 or a like material. The core 1 as best shown in Fig. 12, is employed, and before removing the core 1 from the sand body 22, said sand body is provided with a sprue or pouring opening 23. By separating the cope and drag the core 1 may be removed and the sand core 21 substituted therefor, so that as illustrated in Fig. 13, there will be a space 24 between the sand core 21 and the sand body 22 in communication with the pouring opening 23. The mold is now in condition to be poured and eventually the cast iron pipe 2 is produced.

It is to be recalled that the rounded ends 5 of the core 1 were made true to size and with the plaster of Paris body 10 shrunk and producing the cavity 11 slightly oversize compared to the core 1, consequently when the core pattern 12 is used to produce the same core 21, said sand core will be slightly oversize compared to the cavity in the sand body 22, which cavity is true to size and conforms exactly to the core 1. In other words, the shrinking plaster of Paris eventually produces a core slightly larger at its ends than the end cavities produced in the sand body 22 by the same core that was used in producing the cavity 11, therefore, the sand core 21 must be somewhat forced into the position shown in Fig. 13, with the result that there is no space between the rounded ends of the core 21 and the sand body 22. There is such a tight fit and intimate relation that molten metal cannot pass between the sand core 21 and the sand body 22 and consequently no fins or protuberances are formed on the flanged ends of the cast iron pipe 2.

Of course this same result might be attained by using a core 1 having rounded ends slightly undersize so that the cavity 11, after shrinkage of the body 10 would be true to size. Then it would be necessary to use a core in the sand body 22 that was true to size in all respects, but to compensate for the shrinkage of plaster of Paris and compute the exact size to make the core 1 is a tedious and experimental operation, which I eliminate in the foundry where it is not always possible to work cores and mold bodies to the fractional part of an inch. It is better to have a core oversize relative to the cavity in which it is to be mounted, than undersized, for then it is possible to still fit the core in place and avoid any cracks or spaces into which molten metal might flow and produce imperfections on a casting.

From the foregoing it will be observed that my invention involves a method of first producing a mold cavity in a shrinkable body, using a core pattern to produce a core in the same cavity; producing another mold cavity slightly smaller than the core, and then mounting the core in the core cavity so that there is no misfitting that would permit the formation of fins or the like on a cast article.

One embodiment of my invention has been illustrated, but it is to be understood that the structural elements are susceptible to such variations and modifications as fall within the scope of the appended claims.

What I claim is:—

1. A method of molding articles wherein cores, patterns, and mold bodies constitute a molding apparatus by which my method may be carried into practice, said method consisting in first forming an oversized mold cavity from a core true to size; second, making a core pattern in the mold cavity and forming a core from said core pattern; third, using the core of true size to form another mold cavity differentiating from the first mentioned mold cavity, and fourth, placing the core made from the core pattern in the last mentioned mold cavity and forming an article.

2. A method of molding articles as called for in claim 1, wherein the first mentioned mold cavity is made in a shrinkable material and the last mentioned mold cavity in non-shrinkable material.

3. A method of molding articles as called for in claim 1 wherein a core holder cooperates with the last mentioned mold cavity in producing the core true to size.

4. A method of preventing the formation of fins and other protuberances on cast articles, which method involves the use of a shrinkable body for producing an oversized mold cavity, and then using a core in a mold cavity larger than said cavity so that said core will snugly and non-leakably engage portions of said mold cavity.

5. A method of molding hollow articles, which method consists of forming a mold cavity slightly oversized in a shrinkable mold from a prepared core true to size; producing a core pattern from the oversized mold cavity; forming a second mold cavity from said core pattern; again using the prepared core to form a sand mold cavity true to size; producing a sand core from said core pattern, which sand core is oversize, and then placing the oversized sand core in the sand mold cavity and molding an article.

In testimony whereof I affix my signature.

JOHN B. LUKOMSKI.